United States Patent
Schuurs (10) Patent No.: US 7,451,871 B2
(45) Date of Patent: Nov. 18, 2008

(54) HOUSING FOR STORING MULTIPLE INFORMATION DISCS

(75) Inventor: Johannes Adrianus Maria Schuurs, Kapelllen (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 485 days.

(21) Appl. No.: 10/564,385

(22) PCT Filed: Jul. 5, 2004

(86) PCT No.: PCT/IB2004/051116

§ 371 (c)(1),
(2), (4) Date: Jan. 12, 2006

(87) PCT Pub. No.: WO2005/006336

PCT Pub. Date: Jan. 20, 2005

(65) Prior Publication Data

US 2006/0185994 A1    Aug. 24, 2006

(30) Foreign Application Priority Data

Jul. 14, 2003    (EP)    ................................. 03102141

(51) Int. Cl.
*B65D 85/57* (2006.01)
*B65D 85/30* (2006.01)

(52) U.S. Cl. .................... 206/308.1; 206/309; 206/310; 206/311; 206/312; 206/459.5

(58) Field of Classification Search ................. 206/232, 206/308.1, 308.3, 309, 310, 311, 312, 313, 206/493, 459.5

See application file for complete search history.

(56) References Cited

U.S. PATENT DOCUMENTS 4,535,888 A * 8/1985 Nusselder ................... 206/311

(Continued)

FOREIGN PATENT DOCUMENTS

EP      0114631 A1    8/1984

(Continued)

OTHER PUBLICATIONS

ISR, The Written Opinion of the International Searching Authority PCT/IB2004/051116.

*Primary Examiner*—Quang D. Thanh
*Assistant Examiner*—Andrew Perreault
(74) *Attorney, Agent, or Firm*—Michael E. Belk (57) ABSTRACT

A multiple information disc housing for storing optical discs and including a first housing part (3), a second housing part (5) and an intermediate third housing part (7) arranged between the first and second housing parts. The first housing part is a lid part and the second housing part is a bottom part. The lid part being provided with hinge elements formed as lid part hinge arms (31A, B). The bottom part is provided with hinge elements formed as bottom part corner recesses (37A, B). The intermediate housing part is provided with intermediate housing part hinge elements of two different kinds, (i) intermediate housing part hinge arms (39A, B) and (ii) intermediate housing part corner recesses (41 A, B). Each hinge arm extends into a corresponding corner recess and is rotatably coupled to a respective recessed hinge wall to form a corner hinge. The lid part and the intermediate housing part each comprise hinge arm protection walls arranged such that each respective hinge arm extends between a respective protection wall and a respective hinge wall.

34 Claims, 8 Drawing Sheets

U.S. PATENT DOCUMENTS

| | | | |
|---|---|---|---|
| 4,874,085 A * | 10/1989 | Grobecker et al. | 206/308.1 |
| 5,284,243 A | 2/1994 | Gelardi et al. | |
| 5,685,425 A | 11/1997 | Choi | |
| 5,829,584 A * | 11/1998 | Raucci, Jr. | 206/308.1 |
| 5,833,068 A * | 11/1998 | Fantone | 206/459.1 |
| 5,890,590 A | 4/1999 | Doodson | |
| 5,915,550 A | 6/1999 | Gartz | |
| 6,000,537 A | 12/1999 | Doodson | |
| 6,241,089 B1 | 6/2001 | Grobecker | |
| 7,055,688 B2 * | 6/2006 | Watson et al. | 206/308.1 |
| 7,299,920 B2 * | 11/2007 | Osborn et al. | 206/308.1 |
| 2006/0060483 A1 * | 3/2006 | Schuurs | 206/308.3 |

FOREIGN PATENT DOCUMENTS

| | | |
|---|---|---|
| EP | 0790616 A | 8/1997 |
| EP | 0923079 A1 | 6/1999 |
| WO | 9917291 A2 | 4/1999 |

* cited by examiner

HOUSING FOR STORING MULTIPLE INFORMATION DISCS

BACKGROUND OF THE INVENTION

The invention relates to a housing for storing multiple information discs, more particularly multiple optical discs having a central aperture such as CD's, DVD's etc., the housing comprising the following three housing parts; a hinging first housing part having the general shape of a shallow open box having a first housing part main wall, opposed first housing part lateral side walls and opposed first housing part transverse side walls; a hinging second housing part having the general shape of a shallow open box having a second housing part main wall, opposed second housing part lateral side walls and opposed second housing part transverse side walls; an intermediate third housing part arranged between the first and second housing parts and having an intermediate housing part main wall, opposed intermediate housing part lateral side walls and opposed intermediate housing part transverse side walls; four corner hinges, two for connecting the first housing part to the intermediate housing part and two for connecting the second housing part to the intermediate housing part on opposite sides of the intermediate housing part main wall so that each of the said first and second housing parts hingingly cooperates with the intermediate housing part on opposite sides; each corner hinge being formed by two hinge elements respectively, one hinge element being a hinge arm connected to one of the said three housing parts and the other hinge element being connected to another of the three housing parts.

A housing of this general kind for storing multiple information discs is known from EP 0 114 631 A1. The known housing is designed for the storage of a number of optical discs and may be seen as a special modification of the classic Jewel Box housing for storing a single optical information disc such as a CD, a CD-ROM, a DVD, etc. The well known classic single disc Jewel Box design comprises a lid part which is hingingly connected to a bottom part in which a so called tray part is secured provided with a centrally located holding device for holding the one information disc. The multiple information disc housing according to EP 0 114 631 however basically comprises three housing parts, i.e. two identical hinging housing parts which are identical to the single CD basic Jewel Box bottom part and an intermediate housing part. The intermediate third housing part has opposed lateral intermediate housing part side walls which, in the closed condition of the housing, cover the corresponding lateral side walls of the hinging first and second housing parts. The height dimension of this prior art multiple information disc housing is twice the height dimension of a single disc classic Jewel Box design, the remaining dimension being generally identical to the classic Jewel Box design so that the housing may be arranged next to single disc Jewel boxes in a sales display stand, a bookcase, etc.

This prior art multiple information disc housing has the following disadvantages.

In the absence of a lid part, there is no printed lid part insert sheet available so that a user is not enabled to immediately read information on the inside of the lid part, additionally provided to the information readable from the outside. In the standard single disc housing the lid part may be provided with a simple single sheet information insert or with a multiple page booklet. Jewel Box manufactures use automated machinery to introduce the lid part inserts in the standard Jewel Box lid parts to improve productivity. Unfortunately with the prior art multiple information disc housing, such available production machinery can not be used.

In opening one of the first and second housing parts, a user not only hingingly moves the housing part relative to the remainder of the housing, but also a CD which is provided on the disc holding means of the housing part being moved. There is a risk that the CD may fall out of the housing, more particularly while the hinging housing part which is being moved has a general shape which is identical to a standard Jewel Box bottom part including an inserted tray part. In the bottom part of standard Jewel boxes, the opposed bottom part lateral side walls do not completely cover the side edges of the optical disc. Leaving out the tray parts from one or both the hinging first and second housing parts of the prior art multiple information disc housing is not an option. The tray part is needed to retain the printed insert sheets provided between the tray part and the hinging first and second housing parts respectively, even in cases that a CD would not be provided on the housing part in question.

Providing an information booklet is difficult or impossible in cases wherein the intermediate third housing part main wall is provided with holding means for an optical disc at both of its opposed faces.

The housing includes at least five separate parts, the three housing parts already mentioned and a tray part in each of the two hinging bottom parts and possibly additionally disc holding means at one or both faces of the main wall of the intermediate housing part.

SUMMARY OF THE INVENTION

An object of the invention is to provide a housing of the kind referred to the opening paragraph in which at least one of the above indicated disadvantages is avoided. The housing according to the invention may be provided with many additional features to improve the esthetic appearance, the esthetic quality, the ease of manipulation, etc. so that a more modern and easily manipulated high quality housing for storing a number of information discs may be provided.

The above object is achieved by the housing for storing multiple information discs according to the invention, which has the features as defined in claim 1. Preferably, the first housing part is a lid part and the second housing part is a bottom part.

The housing for storing multiple information discs according to the invention may now be provided with a printed insert sheet or a printed multiple sheet insert booklet of the kind conventional with single disc Jewel Boxes. There is no optical disc provided on holding means on the first housing part, particularly the lid part, so that this part is light and easy to open so that any risk of detachment of an optical disc from the lid part during opening is effectively eliminated. Owing to the special positioning of the hinge arms and the hinge walls, the corner hinges which are formed lie as it were recessed with respect to the lateral contours of the housing formed by the lateral side walls of the second housing part, particularly the bottom part, the intermediate housing part and the first housing part, particularly the lid part.

As a result of this the housing, more in particular the hinges thereof which are thus obtained, is more resistant to mechanical external influences caused by for example dropping or impacts then by the known classic prior art multiple disc housing. The housing according to the invention therefore is suitable for storing all kinds of disc shaped information carriers such as optical or magneto optical discs, for example provided with audio, video or data information. In this respect the multiple information disc housing according to the invention is more related to more modern Jewel Box designs, more particularly of the kind disclosed in U.S. Pat. No. 5,890,590, assigned to the assignee of the present patent application, the disclosure and drawings of which are incorporated herewith by reference.

An embodiment of the invention which is important from the point of view of ease of manipulation by a user is defined in claim 2. In principle the said corner recesses could be provided at opposite intermediate housing part transverse side walls, which would provide a housing having essentially a zig-zag configuration. Manipulation of such a zig-zag configuration however is usually perceived more difficult a user, inducing the risk of dropping the housing or any discs present in the housing or both.

A further preferred embodiment of a housing according to the invention is defined in claim 3. The main advantage of this embodiment is, that in de closed condition of the first housing part, especially the lid part, and the second housing part, especially, the bottom part, the housing may exhibit the general shape of a substantially fully closed rectangular right angled parallelepiped, due to the fact that the hinge arms are positioned in pairs one over the other and the top hinge arm walls of the hinge arms are disposed substantially flush with the lid part main wall and the bottom part main wall respectively.

Preferred also is a further embodiment of the invention according to claim 4. Having rounded corners, the multiple information disc housing according to this embodiment of the invention may have a much more sleek and neat outer appearance than the already discussed prior art multiple disc housing according to EP 0 114 631 A, in fact more in accordance with the more advanced single disc Jewel Box design of U.S. Pat. No. 5,890,590. Also, the presence of rounded housing corners gives better protection to damaging the housing or any of its individual parts.

A further embodiment of the invention is claimed in claim 5. This embodiment enables using the multiple disc housing according to the invention for storing at least three discs, one in the bottom part and two on opposite sides of the intermediate housing part main wall respectively. However, even more discs could be stored. U.S. Pat. No. 6,241,089, also assigned to the present assignee and herewith incorporated by reference, discloses a holding device for co-operation with the center opening of two individual discs, stacked one over the other. With an embodiment of the invention incorporating a holding device of this known kind, for example provided centrally on the side of the intermediate housing part facing the lid part, four information discs may be stored in the multiple disc housing according to the invention. Different other embodiments, to be discussed later in the disclosure, may be used to store four or even more than four information discs in the housing according to the invention.

A further embodiment of the invention is defined in claim 6. The hinge arms and the hinge walls are thus coupled to one another with hinging possibility in a simple and reliable manner which is known per se.

To facilitate the fastening of the lid part to the intermediate housing part and the intermediate housing part to the bottom part respectively, an embodiment of the invention may be used according to claim 7. The hinge arms are preferably resilient in a direction towards one another, i.e. along a line extending between the two arms and/or away from one another whereas the hinge walls are rigid. The studs or round pins are preferably present on the hinge arms and can be easily inserted into the openings which are present in the hinge walls in this case, during the preferably automatic assembly process of the housing. After assembly the resilient property of the hinge arms ensures that the studs remain locked in the openings. The bottom part as well as the side of the intermediate housing part directed to the lid part usually has a box shape and is provided with vertical side walls. The recessed hinge walls are preferably formed by wall portions which are shifted to the inside with respect to the side walls in such a bottom part or intermediate housing part. Furthermore, a somewhat yielding and accordingly particularly effective protection of the corner hinges may be achieved.

In accordance with an embodiment according to claim 8, the protection walls are of a resilient construction and therefore are resilient in a direction towards one another and away from one another.

A further embodiment of the invention is defined in claim 9. According to this embodiment the protection walls extend entirely within the outer contours of the housing. The protection walls preferably lie in the extended directions of the side walls of the bottom parts and the intermediate housing part respectively.

A further embodiment of the invention is defined in claim 10. The rounded transitions which are thus obtained are a desirable way to provide rounded angles at the corner portions of the housing adjacent to corner hinges. Rounded angles render the housing more customer friendly on account of the absence of sharp corner portions and have a improved resistance to damage in comparison to sharp angles. Preferably therefor all corners of the housing are grounded angle corners. In this respect an embodiment of the invention according to claim 11 may be used. With this embodiment, each of the protection walls has a fluent curved portion which merges into a corresponding free end portion so that in a closed condition a rounded transition is formed between corresponding lateral sides and a corresponding rear side of the intermediate housing part and the bottom part respectively.

A further embodiment of the invention is defined in claim 12. The interior tags present on the lid part may be used for automated insertion of a document such as a printed sheet or booklet in the lid part. The tags do not interfere with the design of the lid part lateral side walls.

Preferably a further embodiment of the invention according to claim 13 is used. In this way a low cost high quality product may be achieved.

A further embodiment of the invention is defined in claim 14. Preferably also the embodiment of claim 15 is used. In modern designs of single disc Jewel Box housings, information is visibly provided at all faces and sides of the housing so that the housing may be arranged in a random position on a sales stand or in a storage rack, etc. while the essential information provided may always be visible from the outside. The above latter embodiments provide identical advantages with the multiple information disc housing according to the invention. Preferably, in order to provide maximum visibility of the printed information which may be provided on any inserts included in the housing, a further embodiment of the invention may be used according to claim 16. In this respect a further interesting embodiment of the invention is defined in claim 17.

Further interesting embodiment of the inventions are defined in claims 18 to 31.

The intermediate housing parts of the multiple information disc housing according to the invention may suitably be configured in a variety of ways. One possibility is an embodiment of the invention according to claim 32. In this embodiment the intermediate housing part is not provided with an intermediate housing part retaining means or tray part which is detachably secured to the intermediate housing part, but is provided with an integrally formed intermediate housing part holding device on at least one of its opposed main wall faces.

A further interesting embodiment of the invention is defined in claim 33. With this embodiment, the exterior appearance of the multiple information disc housing according to the invention may easily be made to approach as much as possible the exterior appearance of a single disc housing, so that the two kinds of housings, the single disc housing and the multiple disc housing according to the invention, may immediately be recognized by the customer to belong to a same category of housings, which therefore may be stored in storage compartments provided for housings of this kind, for example in a book case in a private home, in a storage compartment provided for the purpose in a motor car or in a commercial sales stand, etc. Of course the main wall of the intermediate housing part does not necessarily need to have the combined thickness dimension of a lid part stacked onto a bottom part, but may have a thickness dimension which is for example identical to the thickness dimension of a bottom part or a lid part. In this way more room is provided in the multiple information disc housing for the storage of multiple discs or the storage of other items such as information sheets or booklets, etc.

A further interesting embodiment according to the invention is defined in claim 34. The hinging tray part which is provided as a fourth housing part according to this embodiment provides a further means for storing more information discs in the multiple information disc housing of the invention. Hinging tray parts are known per se from the prior art, see for example U.S. Pat. No. 5,284,243 or U.S. Pat. No. 5,685,425, both incorporated herewith by reference. The multiple information disc housing according to the above discussed latter embodiment of the invention comprises a special adaptation of the housing to include a hinging tray part.

A further embodiment according to the invention defined in claim 34 may be interesting to prevent the presence of an open space at the rear end of the hingeable tray part.

These and further and other objects and features of the invention are apparent in the disclosure which includes the above and on-going written specification with the claims and the drawings.

DETAILED DESCRIPTION OF THE DRAWINGS

A preferred multiple information disc housing of the present invention is generally indicated by the numeral 1 in FIGS. 1 to 3, 4 and 5. Optical disks being generally known and not being relevant per se for the invention, are not shown in the drawings.

The housing comprises, among other parts, three housing parts 3 tot 7. Hinging first housing part 3 has the general shape of a shallow open box having a first housing part main wall 9, opposed first housing part lateral side walls 11 A,B and opposed first housing part transverse side walls 13 and 15 respectively. The hinging second housing parts 5 has the general shape of a shallow open box including the second housing part main wall 17, opposed lateral second housing part side walls 19A,B and opposed second housing part transverse side walls 21 and 23 respectively. An intermediate housing part 7 is arranged between the first and second housing parts 3 and 5 and has an intermediate housing part main wall 25, opposed lateral intermediate housing part side walls 27A,B and opposed intermediate housing part transverse side walls 29 and 31 respectively.

Four corner hinges are provided, two for connecting the first housing part 3 to the intermediate housing part 7 and two for connecting the second housing part 5 to be intermediate housing part 7 on opposite sides of the intermediate housing part main wall 25, so that each of the said first and second housing parts 3, 5 hingingly co-operates with the intermediate housing part 7 on opposite sides of the main wall. Each corner hinge is formed by two hinge elements respectively, one hinge element being a hinge arm connected to one of the said three housing parts 3, 5, 7 and the other hinge elements being connected to another of the three housing parts, as to be discussed later on in this description.

According to the invention the first housing part is a lid part 3 and the second housing part is a bottom part 5. The lid part 3 is provided with hinge elements formed as lid part hinge arms 33A and 33B, each lid part hinge arm 33A,B being recessed with respect to the said corresponding lid part lateral side wall 11A,B. The bottom part 5 is provided with hinge elements formed as bottom part corner recesses 35A/B, which bottom part corner recesses 35A/B are formed by a respectively recessed hinge wall 37A,B which is recessed with respect to a corresponding bottom part lateral side wall 19A,B. The intermediate housing part 7 is provided with intermediate housing part hinge elements of two different kinds, (i) a first kind formed as intermediate housing part hinge arms 39A,B, each intermediate housing part hinge arm 39A,B being recessed with respect to a corresponding intermediate housing part lateral side wall 27A,B and aligned with a respective bottom part recessed hinge wall 37A,B, and (ii) a second kind formed as an intermediate housing part corner recess 41A,B, each intermediate housing part corner recess 41A,B being formed by a respective intermediate housing part recessed hinge wall 43A,B and aligned with a respective lid part recessed hinge arm 33A,B. Each hinge arm 33A,B; 39A,B extends into a corresponding corner recess 35A,B; 41A,B and is rotatably coupled to a respective recessed hinge wall 37A,B; 43A,B to form a corner hinge. The lid part 3 and the intermediate housing part 7 each comprise two protection walls, the lid part hinge arm protection walls 45A,B and the intermediate housing part hinge arm protection walls 47A,B respectively, arranged such that each respective hinge arm 33A,B; 39A,B extends between the respective protection wall 45A,B; 47A,B and a respective hinge wall 43A,B; 37A,B.

The intermediate housing part hinge arms 39A,B and the intermediate housing part corner recesses 41A,B are provided at one and the same intermediate housing part transverse side wall 31.

Each lid part hinge arm comprises:
  an outer lid part hinge arm wall 45A,B which is an extension of a respective lid part lateral wall 11A,B,
  an inner lid part hinge arm wall 49A,B which is parallel to and spaced from the outer lid part hinge arm wall 11A,B,
  a rear lid part hinge arm wall 51A,B interconnecting the outer 45A,B and inner 49A,B lid part hinge arm walls and arranged substantially perpendicular to the outer 45A,B and inner 49A,B lid part hinge arm walls,
  a front lid part hinge arm wall 53A,B interconnecting the outer 45A,B and inner 49A,B lid part hinge arm walls and arranged substantially perpendicular to the outer 45A,B and inner 49A,B lid part hinge arm walls and spaced from the rear lid part hinge arm walls 51A,B and
  a top lid part hinge arm wall 55A,B which is substantially an extension of the lid-part main wall 9 and is disposed perpendicularly to the outer 45A,B, inner 49A,B, rear 51A,B and front 53A,B lid part hinge arm walls, the said outer 45A,B, inner 49A,B, rear 51A,B, front 53A,B and top 55A,B lid part hinge arm walls being arranged in a configuration such that together they define a right-angled open box, the opening 57 of which in the closed position of the lid part 3 is directed away from the lid part main wall 9 and toward the intermediate housing part 7, Additionally, each intermediate housing part hinge arm 39A,B comprises:
  an outer intermediate housing part hinge arm wall 47A,B which is an extension of a respective intermediate housing part lateral wall 27A,B,
  an inner intermediate housing part hinge arm wall 57A,B which is parallel to and spaced from the outer intermediate housing part hinge arm wall 47A,B,
  a rear intermediate housing part hinge arm wall 59A,B interconnecting the outer 47A,B and inner 57A,B intermediate housing part hinge arm walls and arranged substantially perpendicular to the outer 47A,B and inner 57A,B intermediate housing part hinge arm walls,
  a front intermediate housing part hinge arm wall 61A,B interconnecting the outer 47A,B and inner 57A,B intermediate housing part hinge arm walls and arranged substantially perpendicular to the outer 47A,B and inner 57A,B intermediate housing part hinge arm walls and spaced from the rear intermediate housing part hinge arm wall 59A,B and
  a top intermediate housing part hinge arm wall 63A,B which is spaced from and substantially parallel to the intermediate-part main wall 25 and is disposed perpendicularly to the outer 47A,B, inner 57A,B, rear 59A,B and front 61A,B intermediate housing part hinge arm walls, the said outer 47A,B, inner 57A,B, rear 59A,B, front 61A,B and top 63A,B intermediate housing part hinge arm walls being arranged in a configuration such, that together they define a right-angled open box, the opening 65A,B of which in the closed position of the lid part 3 and the bottom part 5 is directed towards the lid part 3 and away from the bottom part 5 respectively.

The housing exhibits rounded housing corners at all of its four corners. Retaining devices of a kind known per se from the prior art, the discussion of the details of which will therefore be omitted as being not relevant to the invention, are provided for cooperating with a central aperture of a respective disc, not shown in the drawing. In total for such retaining devices are provided, indicated by the reference numerals 67, 69, 71, 73 respectively. The retaining devices 67 and 69 are provided at opposite sides of the intermediate housing part 7 and the retaining devices 71, 73 are provided on the inner side of the bottom part 5 at opposite sides of a hinging tray part 75, to be discussed later on in the disclosure.

For the hingingable connection of the lid part 3 to the intermediate housing part 7 and in turn of the intermediate housing part 7 to the bottom part 5, hinge elements are provided. The hinge elements comprise the bottom part recessed hinge walls 37A and 37B respectively and the intermediate housing part recessed hinge walls 43A and 43B respectively, including bottom recessed hinge wall openings 77A and 77B respectively and intermediate housing part recessed hinge wall openings 79A and 79B respectively. The hinge elements further comprise lid part hinge arm studs 81A and 81B, cooperating with the intermediate housing part recessed hinge wall openings 79A and 79B respectively, and intermediate hinge arm studs 83A and 83B, cooperating with the bottom part recessed wall hinge openings 77A and 77B respectively.

The said hinge walls 37A,B and 43A,B are rigid and the hinge arms 33A,B and 39A,B are resilient in a direction along a line extending between corresponding hinge arms 33A,B and 39A,B of the lid part 3 and the intermediate housing part 7 respectively. The protection walls 45A,B and 47A,B of these respective hinge arms are of a resilient construction. The protection walls 45A,B and 47A,B extend into corresponding corner recesses 41A,B and 35A,B respectively of the intermediate housing part 7 and the bottom part 5 respectively.

Each of the protection walls 45A,B and 47A,B has a respective free end portion, the lid part hinge arm free end portions 85A,B and the intermediate housing part hinge arm free end portions 87A,B respectively, which free end portion being bent towards one another and extending opposite and spaced a distance from a free end of a respective one of the hinge arms 45A,B and 47A,B respectively. More particularly, each of the protection walls 45A,B, 47A,B has a fluent curved portion 85A,B, 87A,B which merges into a corresponding free end portion and at least when the housing 1 is in a closed state, forms a rounded transition between a corresponding lateral side 11A,B and 27A,B respectively and a corresponding rear side 31 and 23 of the intermediate housing part 7 and the bottom 5 respectively.

Figure 1:
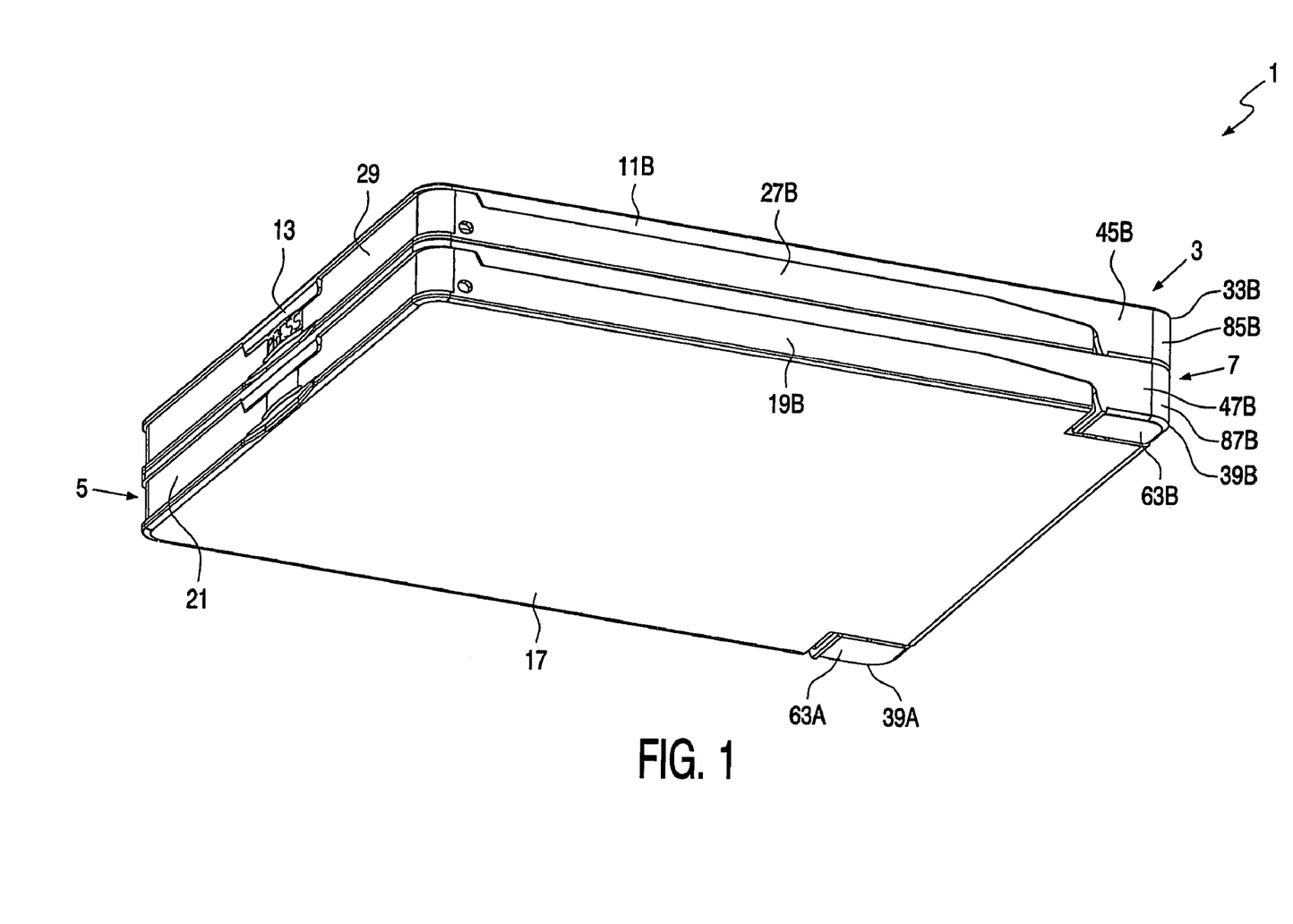
FIG. 1 is an elevated perspective showing the multiple information disc housing of the invention in a fully closed condition.
Figure 2:
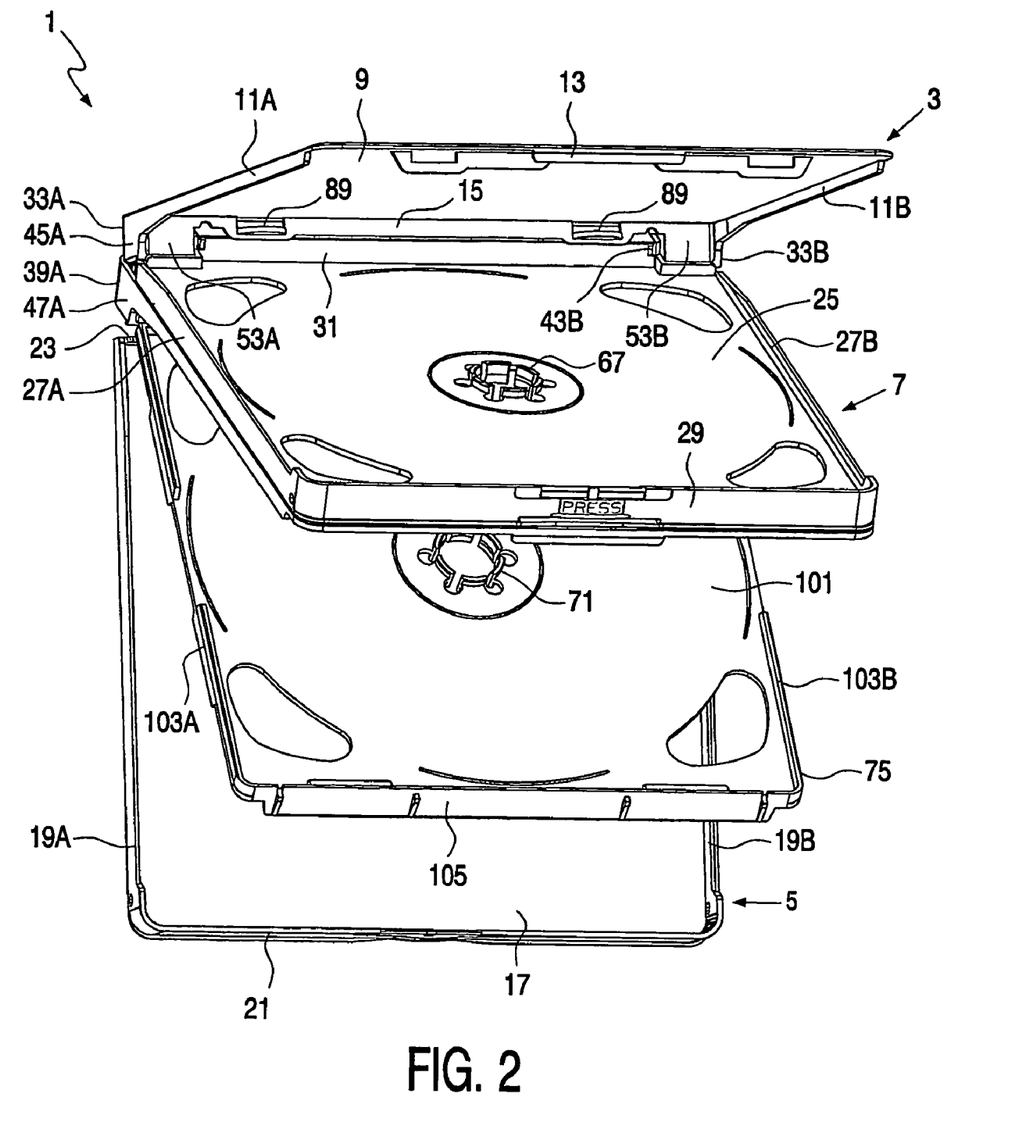
FIG. 2 is an elevated perspective showing the dissembled multiple information disc housing of FIG. 1, in which the lid part, the intermediate housing part, the bottom part and a bottom holding device, are mutually rotated over an angle of approximately 15°.
Figure 3:
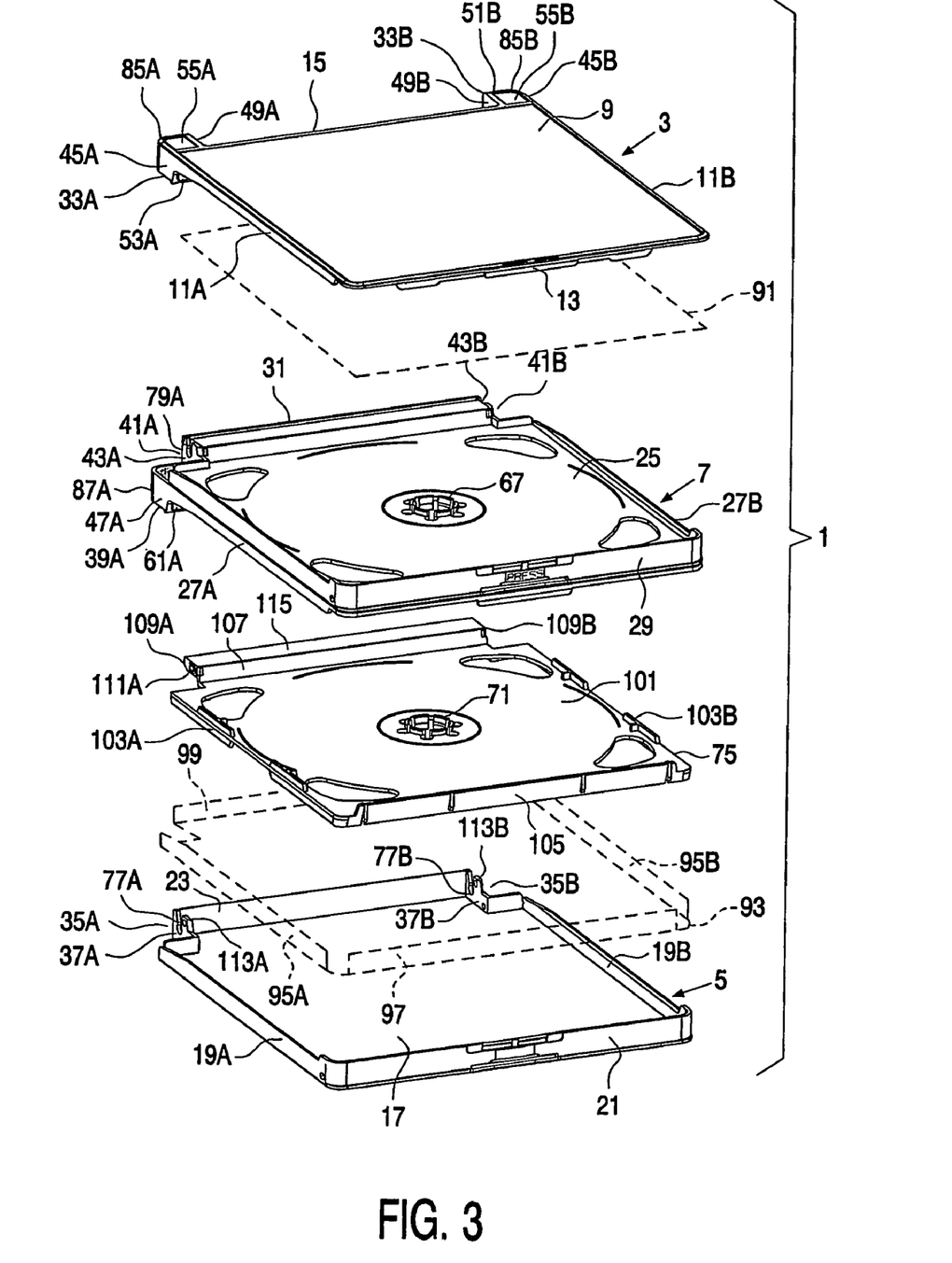
FIG. 3 is an elevated perspective showing the dissembled multiple information disc housing parts and a bottom part holding device, as well as two insert sheets, mutually spaced from each other in generally parallel position.
Figure 4:
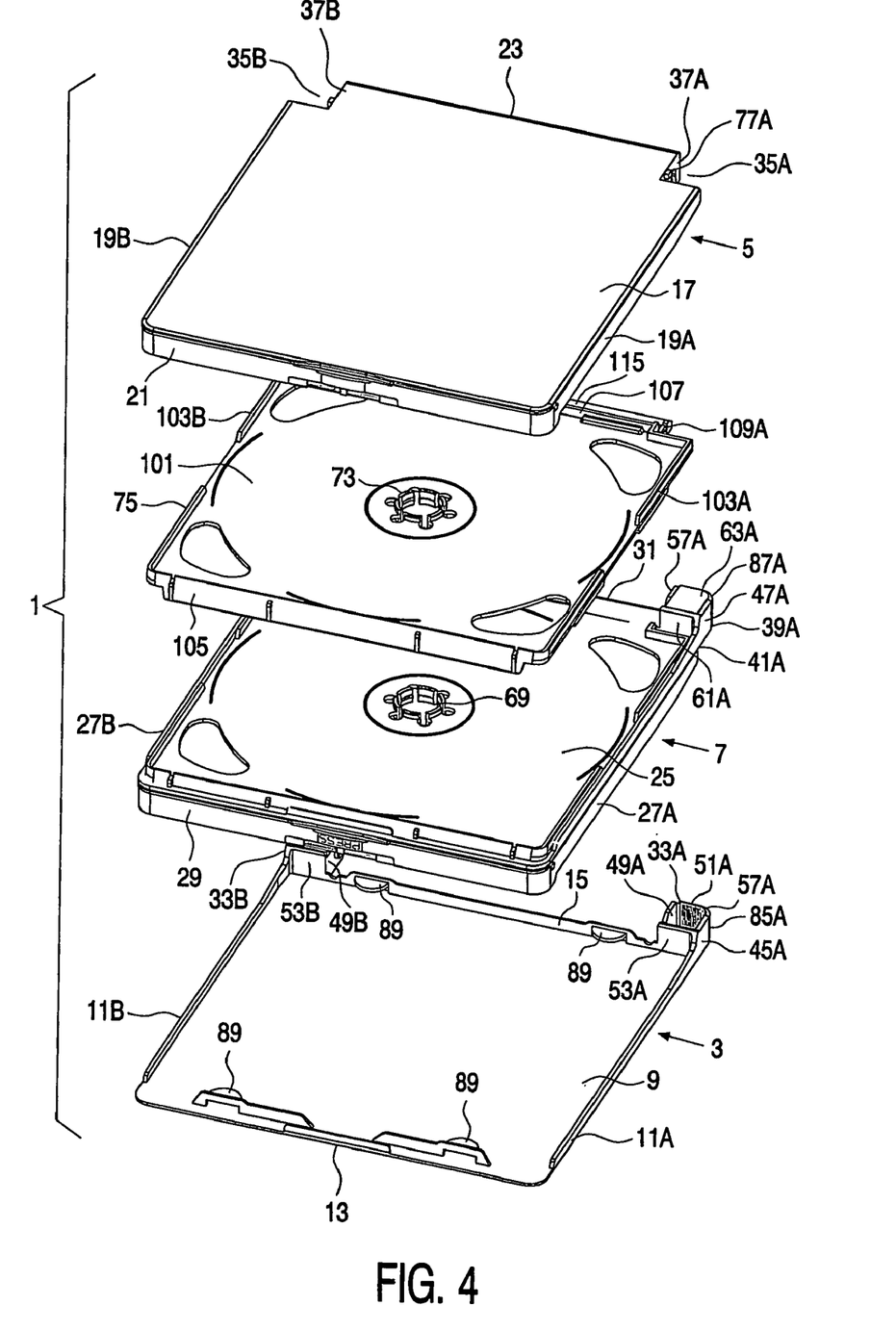
FIG. 4 is an elevated perspective from the front side of an inverted multiple disc housing (bottom part up) of the previous figures, generally seen from the front side.
Figure 5:
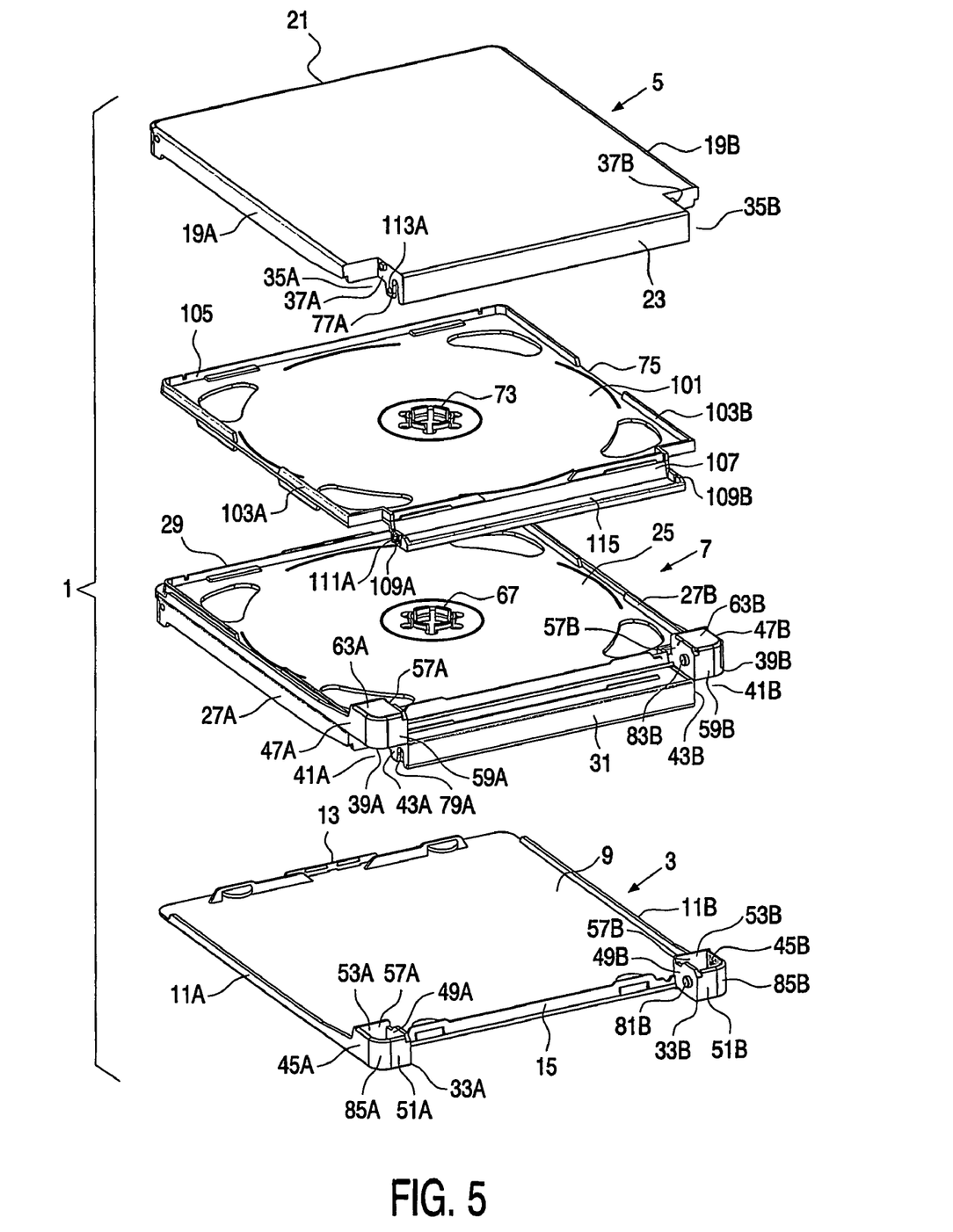
FIG. 5 is an elevated perspective similar to FIG. 4 but generally seen from the rear side.
Figure 6:
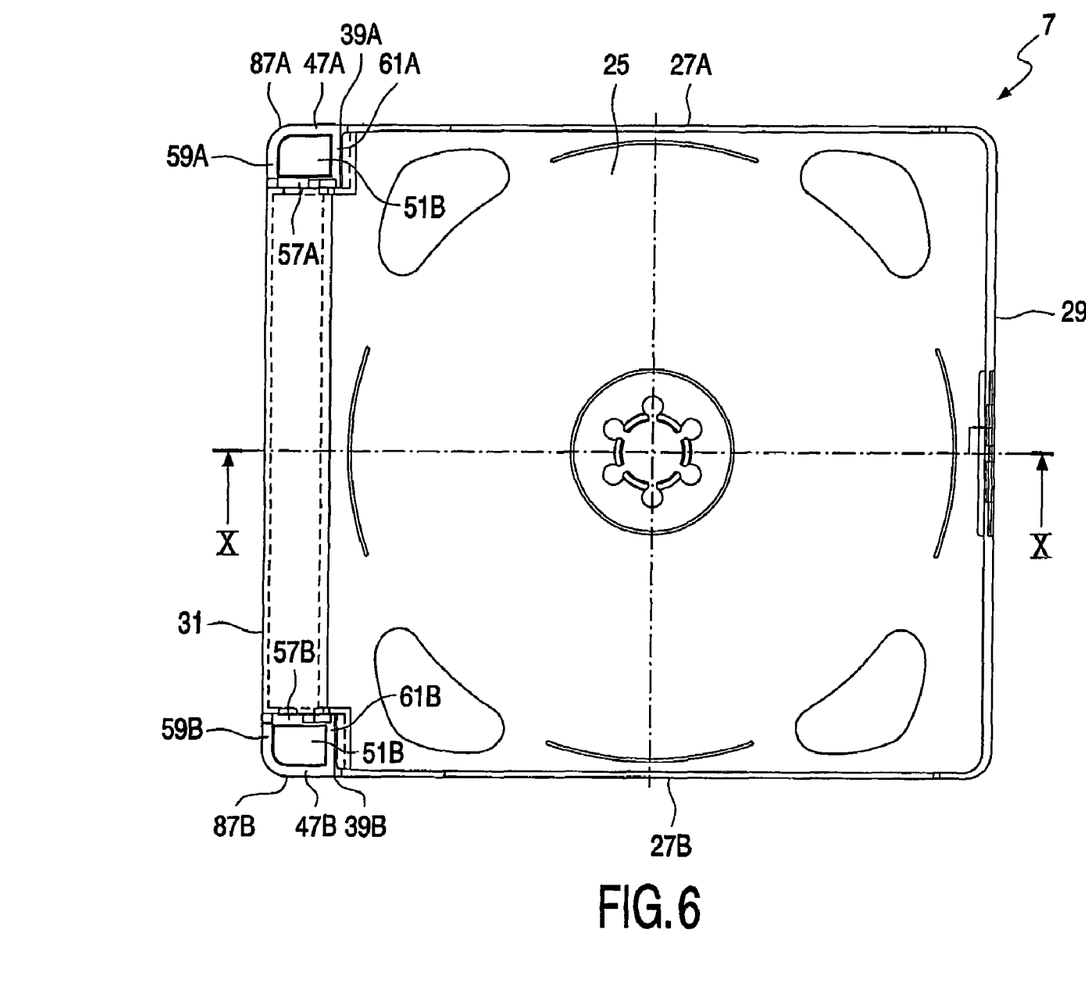
FIG. 6 is a top view showing the lower side of the intermediate housing part.
Figure 7:
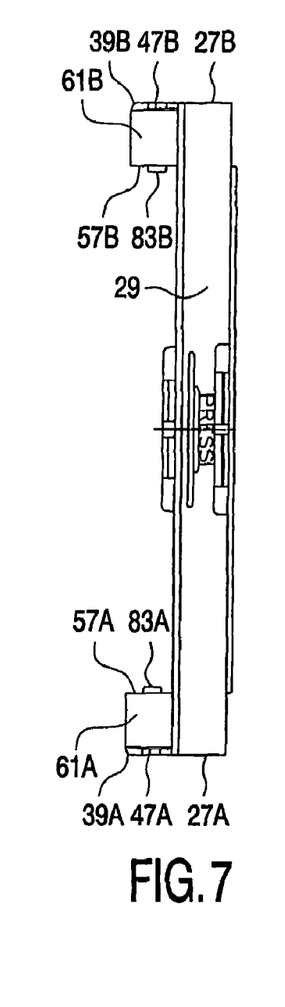
FIG. 7 is a view showing the front side of the intermediate housing part of FIG. 6.
Figure 8:
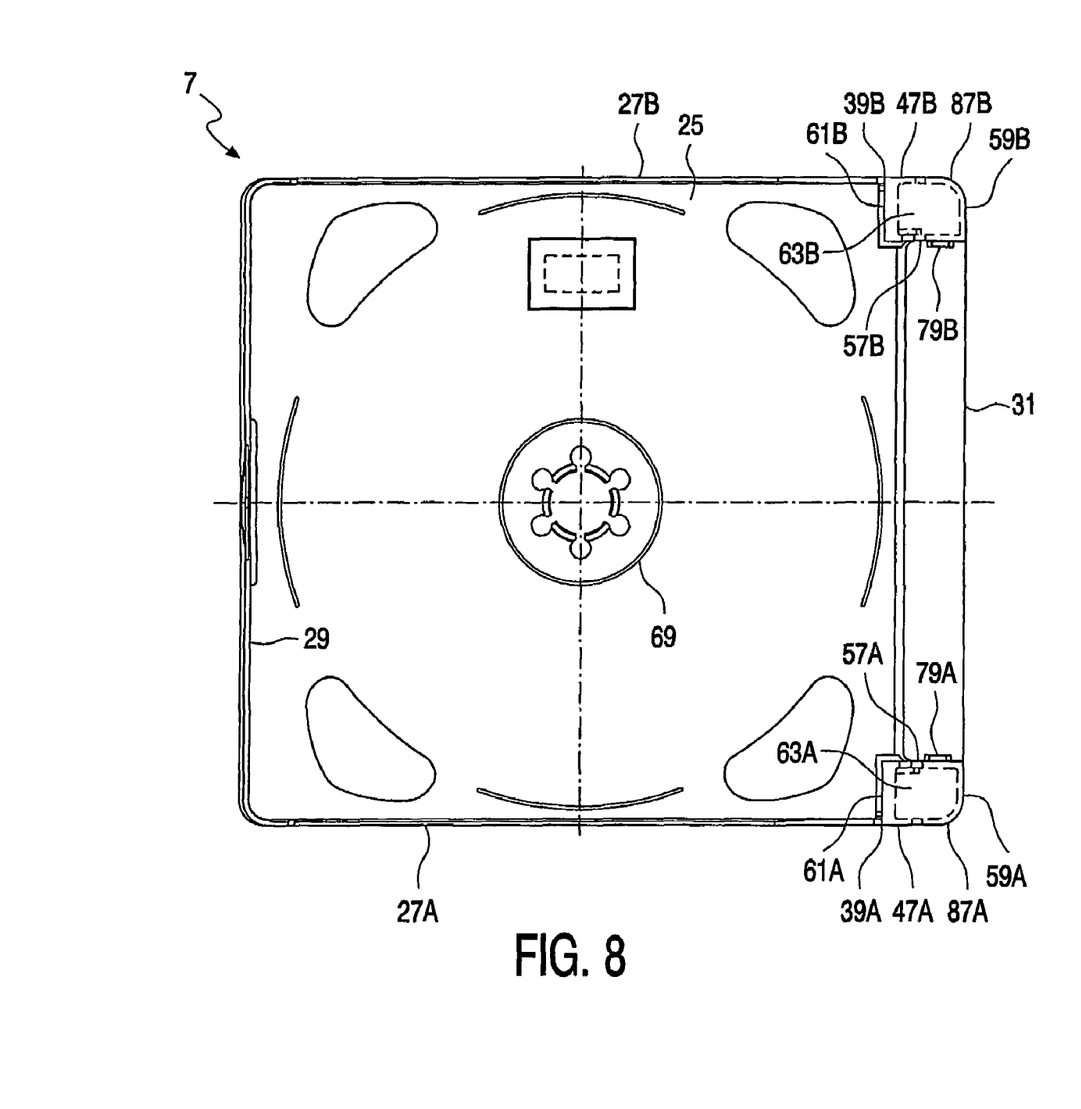
FIG. 8 is a top view showing the upper side of the intermediate housing part of FIGS. 6 and 7.
Figure 9:
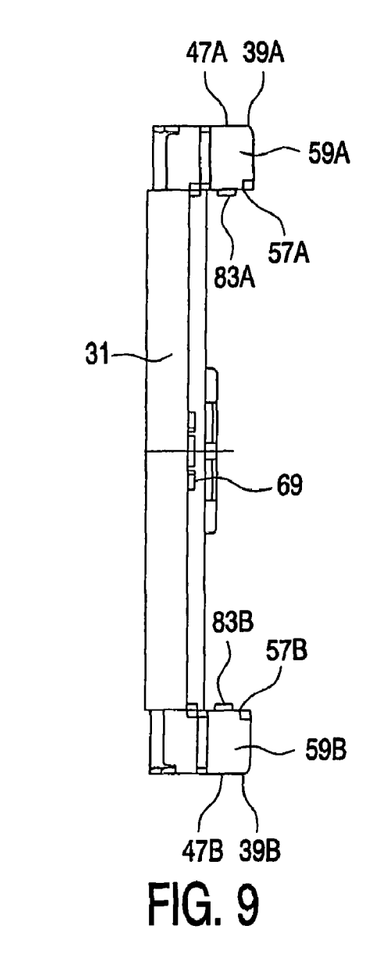
FIG. 9 is a view showing the rear side of the intermediate housing part of FIGS. 6 to 8.
Figure 10:
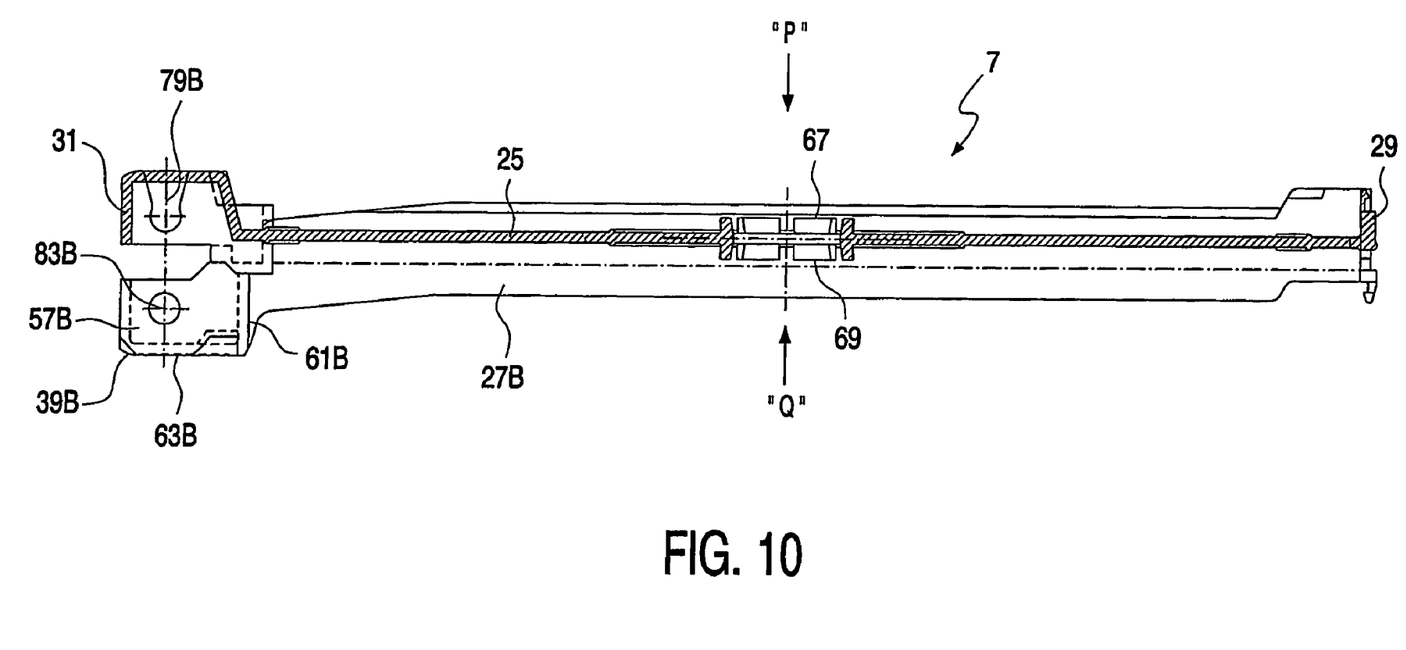
FIG. 10 is a cross-sectional view of the intermediate housing part according to lines X-X in FIG. 6.

In a manner known per se, the lid part 3 includes interior tags 89 extending from respective lid part transverse side walls 13 and 15 towards each other for retaining an inserted document 91, only shown in FIG. 3 by ghost outlines. As well known in the art, such documents may comprise a single sheet of printed information or a small booklet.

The lid part 3, the intermediate housing part 7 and the bottom 5 may all be injection molded products. Preferably, the bottom part main wall 17, the opposed bottom part lateral side walls 19A and 19B and the opposite bottom part transverse side walls 22 and 23 respectively are transparent and a bottom part insert sheet 93, shown in ghost outlines in FIG. 3 only, is arranged on the bottom part main wall 17. Such insert sheets are also well known in the art and may have upright insert sheet lateral portions 95A,B which extends adjacent respective bottom part lateral side walls 19A,B and/or insert sheet transverse portions 97A,B respectively which extend adjacent the bottom transverse side walls 21 and 23 respectively.

In a possible embodiment of the invention which is not shown in de drawings, the opposed intermediate housing part lateral side walls 19A, 19B and the opposed intermediate housing part transverse side walls 21, 23 could also be transparent and an intermediate housing part insert sheet similar to the bottom part insert sheet 93 could be arranged on the intermediate housing part main wall 17. In such a case the intermediate housing part could be a transparent injection molded product like the lid part 3 and the bottom part 5.

The upright portions 95A, 97 and 99 of the bottom part insert sheet have printed information thereon so that information may be observed by a user of the multiple information disc housing of the invention from all sides, through the transparent bottom part lateral side walls 19A and 19B and through the front and rear walls 21 and 23 respectively.

The bottom part lateral side walls 19A,B and the bottom part transverse side walls 21 and 23, as well as the intermediate housing part lateral side walls 27A and 27B and the intermediate housing part transverse side walls 29 and 31 are each formed by an at least substantially uninterrupted wall and have at least substantially the same height with respect to this corresponding bottom part main wall 17 and intermediate housing part main wall 25 respectively. All the upright portions 95A, 95B, 97 and 99 of the insert sheets 93 extend along substantially the length of the respective adjacent bottom part lateral side walls 19A, 19B and the bottom part transverse side walls 21 and 23.

The structure of the intermediate housing part 7 is such that the bottom part rear wall 23 is substantially uninterrupted and has a height corresponding to the height of the bottom part front wall 21 and the bottom part lateral side walls 19A and 19B respectively. The bottom part insert sheet 93 comprises an upright portion 99 which extends adjacent the bottom part rear wall 23. The construction of the lid part is such that the intermediate housing part rear wall 31 is substantially uninterrupted and has a height corresponding to the height of the intermediate housing part front wall 29 and the intermediate housing part lateral side walls 27A and 27B respectively. The intermediate housing part insert sheet, if present, comprises an upright portion which extends adjacent the intermediate housing part rear wall 31.

The bottom part 5 includes the bottom part holding device, conventionally called a tray, 75 for holding at least one information disc. This bottom part holding device or tray 75 is retained in the bottom part retaining means (not shown in the drawing), disposed solely adjacent corners of the bottom part 5. Details of these retaining means and the interaction with the tray part 75 will not be discussed in the present disclosure, these being entirely conventional in the prior art single information disc Jewel Box housings according to U.S. Pat. No. 6,000,537, herewith incorporated by reference, and commercially available from Super Jewel Box International BV, a company having its seat in Waalre, the Netherlands. The intermediate housing part 7 may comprise an embodiment, which is not shown in the drawing, comprising a holding device or tray part similar to the bottom tray part 75 and may comprise an insert sheet similar to the bottom insert sheet 93. The bottom part retaining means, not shown in the drawings, detachably fasten the bottom part holding device or bottom part tray 75 to the said bottom part 5. The bottom part retaining means comprises first and second snap closure elements which are not shown in the drawing at a corner between the bottom front wall and one of the bottom part lateral side walls and at a corner between the bottom part front wall 21 and the other of the bottom part lateral side walls. The bottom part insert sheet 93 has information printed on the side facing the transparent bottom part main wall 17.

In the embodiment of the invention shown in the drawings, the opposed intermediate housing part lateral side walls 27A and 27B and the opposed intermediate housing part transverse side walls 29 and 31 are opaque. Any information available on any insert sheet present in the multiple information disc housing, such as the sheets 91 and 93, therefor is only visible through the main wall 9 of the transparent lid part 3 and the bottom part main wall 17 and the bottom wall lateral side walls 19A and 19B and transverse side walls 21 and 23 respectively.

Preferably, and as shown in the drawings, the intermediate housing part is an integerly formed opaque injection molded housing part 7 which includes integrally formed intermediate housing part holding devices 67, 69, each for holding at least one information disc, on both of the faces of its main wall 25. The embodiment shown in the drawing therefor may include only four injection molded parts, the three housing parts 3, 7 and 5 and the tray part 75. The prior art multiple information disc housing disclosed in the European Patent Publication 0 114 631 A1 includes a minimum of five individual parts, two bottom parts, one intermediate housing part and two tray parts. If an information disc has to be disposed on the intermediate housing part, a separate holding device has to be provided for such a CD.

Highly advantageously, the multiple information disc housing according the presently discussed embodiment according the invention may have the general structure of a stack of two individual shallow boxes, an upper box and a lower box, each box comprising a lid part, a bottom part and two corner hinges arranged at the same side of the housing, according for example to the single disc information disc Jewel Box housing according to U.S. Pat. No. 6,000,537, the bottom part of the upper box and the lid part of the lower box being merged into an integral intermediate housing relative to which the lid part of the upper box and the bottom part of the lower box are hingingly secured. An embodiment of this kind is shown in the drawings. The lid part 3 may be identical to a lid part of a single information disc housing and the bottom part 5, including the tray part 75 and the insert sheet 93, may be identical to the corresponding parts of a single information disc Jewel Box housing. Thus, only the intermediate housing part 7 is a dedicated housing part while the remaining parts of the multiple information disc housing may me identical to the corresponding part of a single information disc Jewel Box housing. This means that to assemble a multiple information disc housing according to the invention according to the drawings, for example to be used for the housing of CD discs, may be assembled from available single CD disc housing parts and additionally a dedicated intermediate housing part. This is highly attractive feature from the point of view of decreasing the manufacturing costs of the multiple information disc housing.

In order to be able to increase the number of CDs which may be housed in the multiple information disc housing according to the invention, the tray parts 75 is configured as a hinging tray part 75 for hinging movement relative to the said bottom part 5, having a tray part main wall 101, opposed tray part lateral side walls 103A and 103B respectively and opposed tray part transverse side walls 105 and 107 respectively and provided with tray part disc retaining devices 71 and 73 respectively at each of the opposite faces of the tray part main wall 101. The hinging tray part 75 is provided with hinge elements formed as tray part hinge arms 109A and 109B respectively, each tray part hinge arm being recessed with respect to a corresponding hinging tray part lateral side wall 103A and 103B respectively.

Each tray part hinge arm 109A,B is rotatably coupled to a respective recessed bottom part hinge wall 37A, 37B respectively to form a corner hinge at a side opposite the intermediate housing part hinge arms 47A, 47B respectively, such that the hinging tray part hinge arms 109A and 109B extend between and hingingly cooperate with the two recessed bottom hinge walls 37A and 37B respectively. To enable the hinging movement of the hinging tray part 75 relative to the bottom part 5, the hinging tray part 75 is provided with hinging tray part studs 111A and 111B, provided on the outwardly facing surfaces of the hinging tray part hinge arms 109A and 109B respectively. These cooperate with additional bottom recessed hinge wall openings 113A and 113B respectively, provided in the bottom part recessed hinge walls 37A and 37B respectively. The hinging tray part hinge arms 109A and 109B are interconnected by a flat interconnection part 115 extending in a plane parallel to the tray part main wall 101.

While the invention has been described with reference to a specific and advantageous preferred embodiment, modifications and variations of the invention may be constructed without departing from the scope of the invention, which is defined in the following claims.

The invention claimed is:

1. A multiple information disc housing (1) for storing information discs, the housing comprising: a first housing part (3) having a first housing part main wall (9), opposed first housing part lateral side walls (11A, B) and opposed first housing part transverse side walls (13-15), a second housing part (5) having a second housing part main wall (17), opposed second housing part lateral side walls (19A,B) and opposed second housing part transverse side walls (21, 23), an intermediate third housing part (7) arranged between the first and second housing parts (3, 5) and having an intermediate housing part main wall (25), opposed intermediate housing part lateral side walls (27A,B) and opposed intermediate housing part transverse side walls (29, 31), corner hinges for connecting the first housing part to the intermediate housing part (7) and for connecting the second housing part (5) to the intermediate housing part (7), each corner hinge being formed by hinge elements, wherein the first housing part (3) is provided with hinge elements formed as first housing part hinge arms (31A, B), each first housing part hinge arm (33A,B) recessed with respect to the corresponding first housing part lateral side wall (11A, B), the second housing part (5) is provided with hinge elements formed as second housing part corner recesses (35A,B), which are formed by a respective second housing part recessed hinge wall (37A,B) recessed with respect to a corresponding second housing part lateral side wall (19A,B), the intermediate housing part (2) is provided with intermediate housing part hinge elements of two different kinds, of which a first kind is formed as intermediate housing part hinge arms (39A,B), which each are recessed with respect to the corresponding intermediate housing part lateral side wall (27A,B) and aligned with a respective second housing part recessed hinge wall (37A,B), and of which a second kind is formed as intermediate housing part corner recesses (41A,B), which each are formed by a respective intermediate housing part recessed hinge wall (43A,B) and aligned with a respective first housing part recessed hinge arm (33A,B), each hinge arm (33A,B; 39A,B) extends into a corresponding corner recess (35A,B; 41A,B) and is rotatably coupled to a respective recessed hinge wall (37A,B; 43A,B) to form a corner hinge, and wherein the first housing part (3) and the intermediate housing part (7) each comprise two protection walls, first housing part hinge arm protection walls (45A,B) and intermediate housing part hinge arm protection walls (47A, B) respectively, arranged such that each respective hinge arm (33A,B; 39A,B) extends between a respective protection wall (45A,B; 47A,B) and a respective hinge wall (43A,B; 37A,B); wherein each first housing part hinge arm (33A,B) comprises: an outer first housing part hinge arm wall (45A,B) which is an extension of a respective first housing part lateral wall (11A, B), an inner first housing part hinge arm wall (49A,B) which is parallel to and spaced from the outer first housing part hinge arm wall (11A,B), a rear first housing part hinge arm wall (51A,B) interconnecting the outer (45A,B) and inner (49A,B) first housing part hinge arm walls and arranged substantially perpendicular to the outer (45A,B) and inner (49A,B) first housing part hinge arm walls, a front first housing part hinge arm wall (53A,B) interconnecting the outer (45A,B) and inner (49A,B) first housing part hinge arm walls and arranged substantially perpendicular to the outer (45A,B) and inner (49A,B) first housing part hinge arm walls and spaced from the rear first housing part hinge arm walls (51A,B) and a top first housing part hinge arm wall (55A,B) which is substantially an extension of the first housing part main wall (9) and is disposed perpendicularly to the outer (45A,B), inner (49A, B), rear (5 1A,B) and front (53A,B) first housing part hinge arm walls, the outer (45A,B), inner (49A,B), rear (5 1A,B), front (53A,B) and top (55A,B) first housing part hinge arm walls being arranged in a configuration such that together they define a right-angled open box, the opening (57) of which in the closed position of the lid part (3) is directed away from the first housing part main wall (9) and toward the intermediate housing part (7), and wherein each intermediate housing part hinge arm (39A,B) comprises: an outer intermediate housing part hinge arm wall (47A,B) which is an extension of a respective intermediate housing part lateral wall (27A,B), an inner intermediate housing part hinge arm wall (57A,B) which is parallel to and spaced from the outer intermediate housing part hinge arm wall (47A,B), a rear intermediate housing part hinge arm wall (59A,B) interconnecting the outer (47A,B) and inner (57A,B) intermediate housing part hinge arm walls and arranged substantially perpendicular to the outer (47A,B) and inner (57A,B) intermediate housing part hinge arm walls, a front intermediate housing part hinge arm wall (61A,B) interconnecting the outer (47A,B) and inner (57A,B) intermediate housing part hinge arm walls and arranged substantially perpendicular to the outer (47A,B) and inner (57A,B) intermediate housing part hinge arm walls and spaced from the rear intermediate housing part hinge arm wall (59A,B) and a top intermediate housing part hinge arm wall (63A,B) which is spaced from and substantially parallel to the intermediate housing part main wall (25) and is disposed perpendicularly to the outer (47A,B), inner (57A,B), rear (59A,B) and front (61A,B) intermediate housing part hinge arm walls, the said outer (47A,B), inner (57A,B), rear (59A, B), front (61A,B) and top (63A,B) intermediate housing part hinge arm walls being arranged in a configuration such, that together they define a right-angled open box, the opening (65A,B) of which in the closed position of the lid part (3) and the bottom part is directed towards the lid part (3) and away from the bottom part (5) whereby in the closed condition of the first housing part (3) and the second housing part (5) the housing (1) exhibits the general shape of a substantially fully closed rectangular right angled parallelepiped, the hinge arms (33A,B; 39A,B) being positioned in pairs one over the other at opposite rear side housing corners, the outer (45A,B; 47A, B) inner (49A,B; 57A,B), rear (5 1A,B; 59A,B) and front (53A,B; 61A,B) hinge arm walls of corresponding pairs of hinge arms being disposed substantially flush with each other and the top hinge arm walls (55A,B; 63A,B) being disposed substantially flush with the first housing part main wall (9) and the second housing part main wall (25) respectively.

2. A multiple information disc housing (1) according to claim 1, wherein in that the intermediate housing part hinge arms (39A,B) as well as the intermediate housing part corner recesses (41A,B) are provided at one and the same intermediate housing part transverse side wall (31).

3. A multiple information disc housing (1) according to claim 1, wherein the housing exhibits rounded housing corners at all of its four corners.

4. A multiple information disc housing (1) according to claim 1, wherein a retaining device (67, 69; 71, 73) for cooperation with a central aperture of a respective disc is provided at least at one side of the intermediate housing part (7) and at the inner side of the second housing part (5).

5. A multiple information disc housing (1) according to claim 1, wherein one of the hinge elements (37A,B; 43A,B) of a pair of hinge elements comprises an opening (77A,B; 79A,B) and the other hinge element comprises a stud (81A,B; 83A,B) which projects into the opening (77A,B; 79A,B).

6. A multiple information disc housing (1) according to claim 1, wherein the hinge walls (37A,B; 43A,B) are rigid, and the hinge arms (33A,B; 39A,B) are resilient in a direction along a line extending between corresponding hinge arms (33A,B; 39A,B) of the lid part (3) and the intermediate housing part (7) respectively.

7. A multiple information disc housing (1) according to claim 1, wherein the protection walls (45A,B; 47A,B) are of a resilient construction.

8. A multiple information disc housing (1) according to claim 1, wherein the protection walls (45A,B; 47A,B) extend into corresponding corner recesses (41A,B; 35A,B) of the intermediate housing part (7) and the second housing part (5) respectively.

9. A multiple information disc housing (1) according to claim 1, wherein each of the protection walls (45A,B; 47A,B) has a respective free end portion (85A,B; 87A,B), said free end portions (85A,B; 87A,B) being bent toward one another and extending opposite, and spaced a distance from, a free end of a respective one of the hinge arms (45A,B; 47A,B).

10. A multiple information disc housing (1) according to claim 9, wherein each of the protection walls (45A,B; 47A,B) has a fluent curved portion (85A,B; 87A,B) which merges into a corresponding free end portion and, at least when the housing (1) is in a closed state, forms a rounded transition between a corresponding lateral side (11A,B; 27A,B) and a corresponding rear side (31; 23) of the intermediate housing part (7) and the second housing part (5) respectively.

11. A multiple information disc housing (1) to claim 1, wherein the first housing part (3) includes interior tags (89) extending from respective first housing part transverse side walls (13; 15) towards each other, for retaining an inserted document (91).

12. A multiple information disc housing (1) according to claim 1, wherein the first housing part (3), the intermediate housing part (7) and the second housing part (5) are injection-molded products.

13. A multiple information disc housing (1) according to claim 1, wherein:
the second housing part main wall (17), the opposed second housing part lateral side walls (19A,B) and the opposed second housing part transverse side walls (21, 23) are transparent,
a second housing part insert sheet (93) is arranged on the second housing part main wall (17),
the second housing part insert sheet (93) has upright insert sheet lateral portions (95A,B) which extend adjacent respective second housing part lateral side walls (19A, B) and/or insert sheet transverse portions (97, 99) which extend adjacent respective second housing part transverse side walls (21, 23).

14. A multiple information disc housing (1) according to claim 13, wherein all the upright portions (95A,B, 97, 99) of the second housing part insert sheet have printed information thereon.

15. A multiple information disc housing (1) according to claim 13, wherein the second housing part lateral side walls (19A,B) and the second housing part transverse side walls (21, 23) are each formed by an at least substantially uninterrupted wall and have at least substantially the same height with respect to the corresponding second housing part main wall (17).

16. A multiple information disc housing (1) according to claim 13, wherein all the upright portions (95A, 95B, 97, 99) of the second housing part insert sheet (93) extend along substantially the length of the respective adjacent side wall (19A,B, 21, 23).

17. A multiple information disc housing (1) according to claim 13, wherein: the second housing part transverse side walls are a second housing part rear wall and a second housing part front wall and the construction of the intermediate housing part (7) is such that the second housing part rear wall (23) is substantially uninterrupted and has a height corresponding to the height of the second housing part front wall (21) and the second housing part lateral side walls (19A, 19B), and
the second housing part insert sheet (93) comprises an upright portion (99) which extends adjacent the second housing part rear wall (23),
the construction of the first housing part is such that the intermediate housing part rear wall (31) is substantially uninterrupted and has a height corresponding to the height of the intermediate housing part front wall (29) and the intermediate housing part lateral side walls (27A, 27B).

18. A multiple information disc housing (1) according to claim 13, wherein:
the second housing part (5) includes a second housing part holding device (75) for holding at least one information disc,
the second housing part lateral side walls (19A, 19B) and transverse walls (21, 23) are substantially uninterrupted transparent walls,
the second housing part holding device (75) is retained in the second housing part (5) by second housing part retaining means disposed solely adjacent corners of the second housing part (5),
the second housing part insert sheet has upright portions which extend adjacent the second housing part lateral and transverse side walls along substantially the length thereof,
at least a section of each of the upright portions of the second housing part insert sheet extending adjacent the second housing part lateral and transverse side walls has printed information thereon and
the intermediate housing part includes a intermediate housing part holding device for holding at least one information disc,
the intermediate housing part side walls and transverse walls are substantially uninterrupted transparent walls,
the intermediate housing part holding device is retained in the intermediate housing part by intermediate housing part retaining means disposed solely adjacent corners of the intermediate housing part, the intermediate housing part insert sheet has upright portions which extend adjacent the intermediate housing part lateral and transverse side walls along substantially the length thereof, at least a section of each of the upright portions of the intermediate housing part insert sheet extending adjacent the intermediate housing part lateral and transverse side walls has printed information thereon.

19. A multiple information disc housing (1) according to claim 18, wherein the second housing part retaining means detachably fasten the second housing part holding device (75) to the said second housing part (5).

20. A multiple information disc housing (1) according to claim 18, wherein the second housing part transverse side walls are a second housing part rear wall and a second housing part front wall and the second housing part retaining means comprises a first second housing part snap closure element at a corner between the second housing part front wall (21) and one of the second housing part lateral side walls (19A, 19B), and a second housing part second snap closure element at a corner between the second housing part front wall (21) and the other of the second housing part lateral side walls.

21. A multiple information disc housing (1) according to claim 13, wherein the second housing part insert sheet (93) has information printed on the side facing the second housing part main wall (17).

22. A multiple information disc housing (1) according to claim 1, wherein:
the second housing part main wall (5), the opposed second housing part lateral side walls (19A, 19B) and the opposed second housing part transverse side walls (21, 23) are transparent,
a second housing part insert sheet (93) is arranged on the second housing part main wall (17),
the second housing part insert sheet (93) has upright insert sheet lateral portions (95A,B) which extend adjacent respective second housing part lateral side walls (19A, 19B) and/or insert sheet transverse portions (97, 99) which extend adjacent respective second housing part transverse side walls (21, 23) and
the opposed intermediate housing part lateral side walls (27A, 27B) and the opposed intermediate housing part transverse side walls (29, 31) are opaque.

23. A multiple information disc housing (1) according to claim 22, wherein all the upright portions (95A,B, 97, 99) of the second housing part insert sheet (93) have printed information thereon.

24. A multiple information disc housing (1) according to claim 22, wherein the second housing part lateral side walls (19A,B) and the second housing part transverse side walls (21, 23) are each formed by an at least substantially uninterrupted wall and have at least substantially the same height with respect to the corresponding second housing part main wall(17).

25. A multiple information disc housing (1) according to claim 22, wherein all the upright portions (95A,B, 97, 99) of the second housing part insert sheet (93) extend along substantially the length of the respective second housing part adjacent side wall (19a,b, 21, 23).

26. A multiple information disc housing (1) according to claim 22, wherein: the second housing part transverse side walls are a second housing part rear wall and a second housing part front wall and the construction of the intermediate housing part (7) is such that the second housing part rear wall (23) is substantially uninterrupted and has a height corresponding to the height of the second housing part front wall (21) and the second housing part lateral side walls (19A,B), and the second housing part insert sheet (93) comprises an upright portion (99) which extends adjacent the second housing part rear wall (23) and the construction of the first housing part (3) is such that the intermediate housing part rear wall (31) is substantially uninterrupted and has a height corresponding to the height of the intermediate housing part front wall (29) and the intermediate housing part lateral side walls (27A,B).

27. A multiple information disc housing (1) according to claim 11, wherein:
the second housing part (5) includes a second housing part holding device (75) for holding at least one information disc,
the second housing part lateral side walls (19A,B) and transverse side walls (21, 23) are substantially uninterrupted transparent walls,
the second housing part holding device (75) is retained in the second housing part (5) by second housing part retaining means disposed solely adjacent corners of the second housing part (5),
a second housing part insert sheet (93) has upright portions (95A,B, 97, 99) which extend adjacent the second housing part lateral (19A,B) and transverse (21, 23) side walls along substantially the length thereof,
at least a section of each of the upright portions (95A,B, 97, 99) of the second housing part insert sheet (93) extending adjacent the second housing part lateral (19A,B) and transverse (21, 23) side walls has printed information thereon.

28. A multiple information disc housing (1) according to claim 27, wherein the second housing part (5) retaining means detachably fasten the second housing part holding device (75) to the said second housing part (5).

29. A multiple information disc housing (1) according to claim 27, said wherein the second housing part transverse side walls are a second housing part rear wall and a second housing part front wall and the second housing part retaining means (75) comprises a first second housing part snap closure element at a corner between the second housing part front wall (21) and one of the second housing part lateral side walls (19A,B), and a second housing part second snap closure element at a corner between the second housing part front wall (21) and the other of the second housing part lateral side walls (19A,B).

30. A multiple information disc housing (1) according to claim 22, wherein the second housing part insert sheet (93) has information printed on the side facing the second housing part main wall (17).

31. A multiple information disc housing (1) according to claim 1, wherein the intermediate housing part is an integrally formed opaque injection molded housing part (7) including an integrally formed intermediate housing part holding device (67, 69) for holding at least one information disc on at least one mail wall (25) face of the intermediate housing part.

32. A multiple information disc housing (1) according to claim 1, wherein the housing has the general structure of a stack of two individual shallow boxes, an upper box and a lower box, each box comprising a first housing part, a second housing part and two corner hinges arranged at the same side of the housing, and wherein the second housing part of the upper box and the first housing part of the lower box are merged into an integral intermediate housing part relative to which the first housing part of the upper box and the second housing part of the lower box are hinged.

33. A multiple information disc housing (1) according to claim 1, wherein:

the housing comprises a hinging tray part (75) for hinging movement relative to the said second housing part (5), having a tray part main wall (101), opposed tray part lateral side walls (103A,B) and opposed tray part transverse side walls (105, 107) and provided with a tray part disc retaining device (71, 73) at least at one of the faces of the tray part main wall (101), the hinging tray part (75) is provided with hinge elements formed as tray part hinge arms (109A,B), each tray part hinge arm (109A, 109B) being recessed with respect to a corresponding hinging tray part lateral side wall (103A, 103B), each tray part hinge arm (109A,B) being rotatably coupled to a respective said recessed second housing part hinge wall (37A,B) to form a corner hinge on a side opposite the intermediate housing part hinge arm (47A, B), such that the hinging tray part hinge arms (109A,B) extend between and hingingly cooperate with the two recessed second housing part hinge walls (37A,B).

34. A multiple information disc housing (1) according to claim 33, wherein the hinging tray part hinge arms (109A, 109B) are interconnected by a flat interconnecting part (115) extending in a plane parallel to the tray part main wall (101).

\* \* \* \* \*